United States Patent [19]

Burdick et al.

[11] 3,831,525

[45] Aug. 27, 1974

[54] AUTOMATED ASSEMBLY LINE WITH AIR CUSHION DEVICES

[75] Inventors: Robert E. Burdick; Terry M. Baker; Baxter K. Wolfe, all of Santa Barbara, Calif.

[73] Assignee: Rolair Systems Inc., Santa Barbara, Calif.

[22] Filed: Jan. 26, 1973

[21] Appl. No.: 326,792

[52] U.S. Cl.............................. 104/23 FS, 180/120
[51] Int. Cl............................................ B61b 13/08
[58] Field of Search.......... 104/23 FS, 134, 88, 130, 104/134; 198/19, 38; 180/116, 117, 120, 121, 122; 214/16.4 A, 1 BE

[56] References Cited
UNITED STATES PATENTS

| | | | |
|---|---|---|---|
| 3,513,934 | 5/1970 | Crowley | 104/23 FS |
| 3,581,915 | 6/1971 | Saul | 214/16.4 A |
| 3,621,787 | 11/1971 | Giraud | 104/23 FS |
| 3,655,074 | 4/1972 | Pipes | 104/23 FS |

Primary Examiner—M. Henson Wood, Jr.
Assistant Examiner—D. W. Kern
Attorney, Agent, or Firm—Harris, Kern, Wallen & Tinsley

[57] ABSTRACT

An assembly line with a plurality of self propelled air cushion transporters for moving large loads through an assembly area. An automatic control system with a plurality of control points, with the transporters moving continuously except when a stop signal is provided at a control point. A programmable automatic control can program the transporter movement for an entire shift and provide transporter movements at predetermined intervals, typically 2 minutes.

5 Claims, 7 Drawing Figures

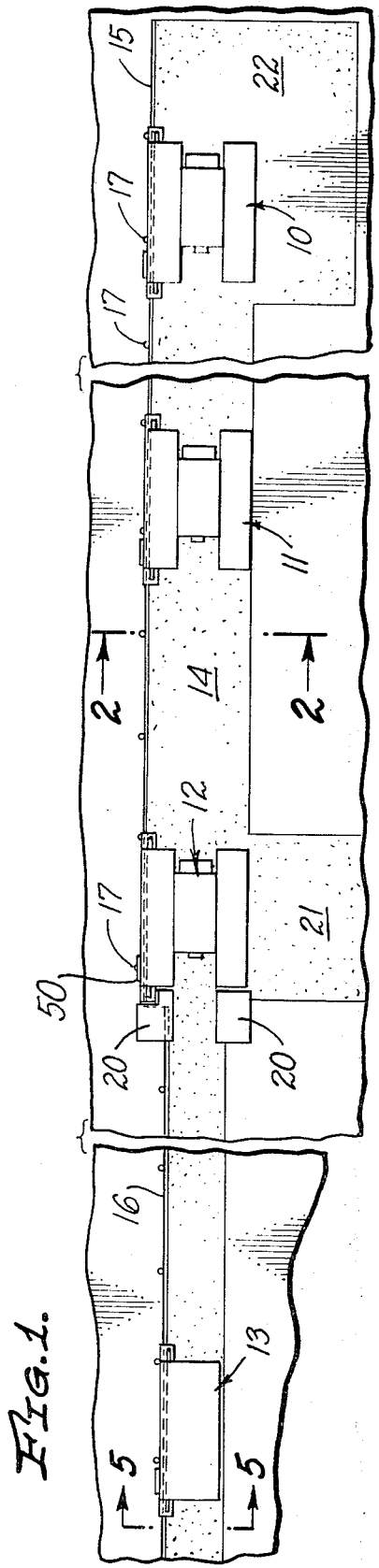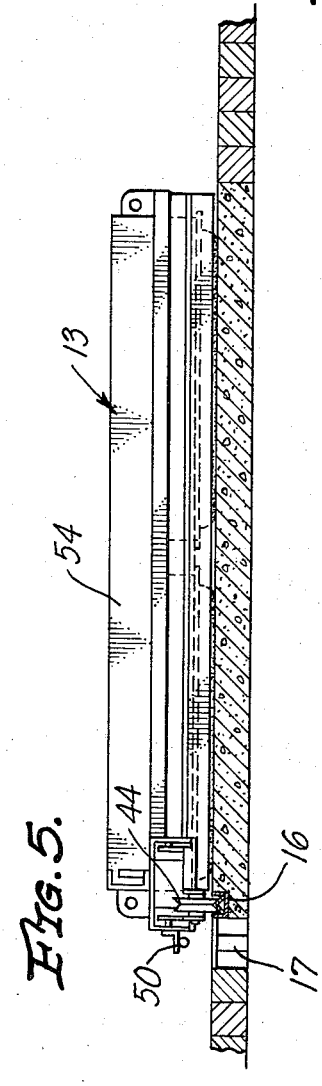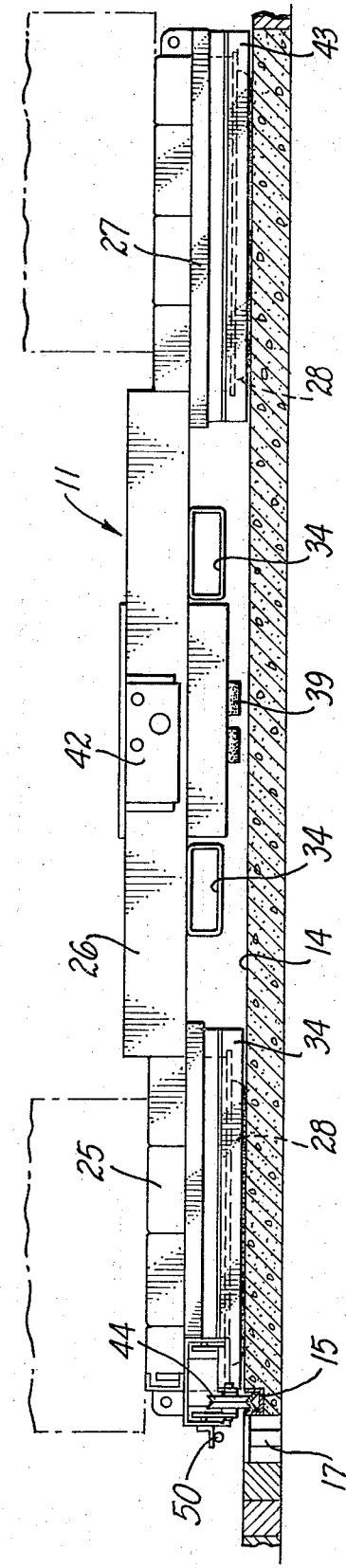

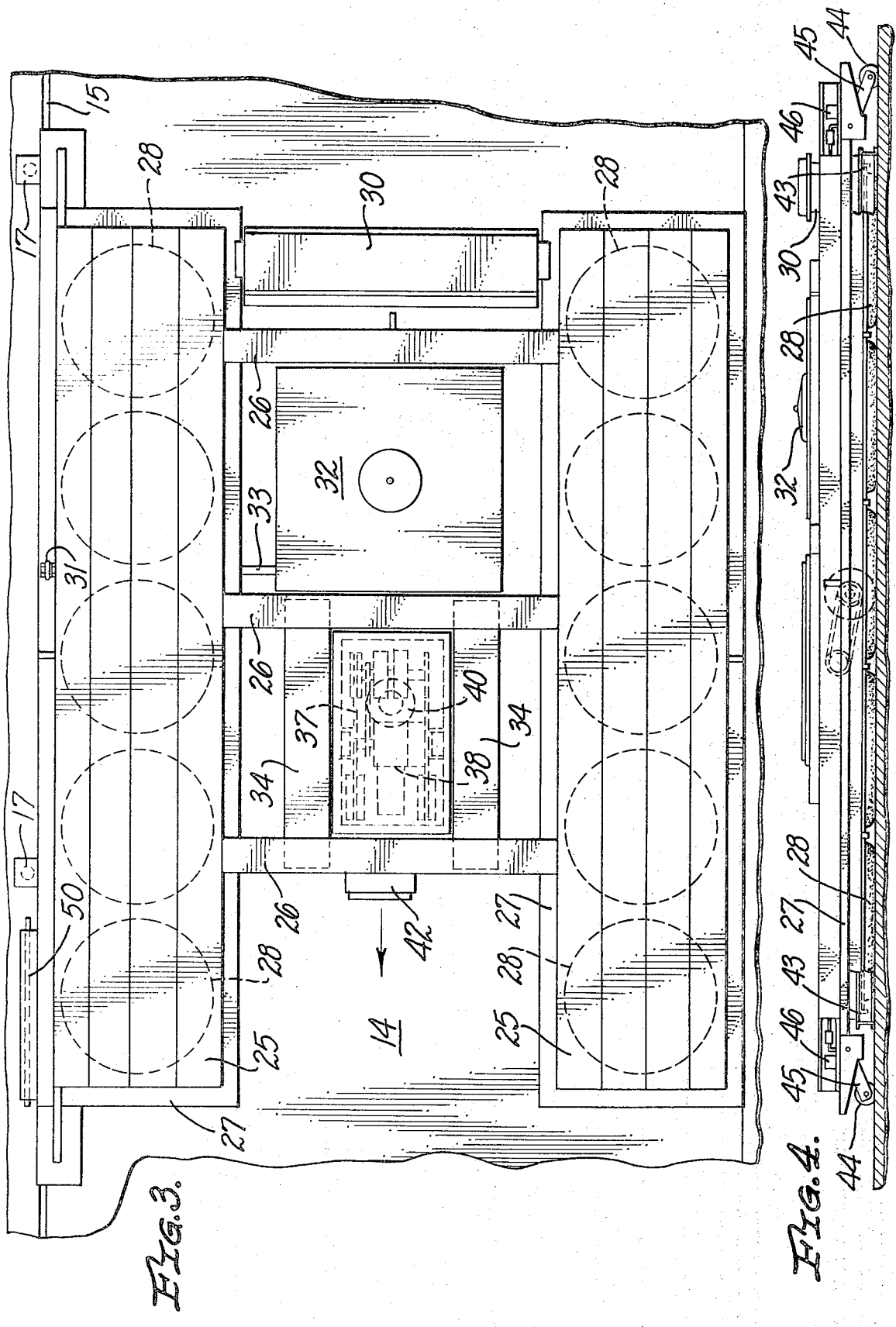

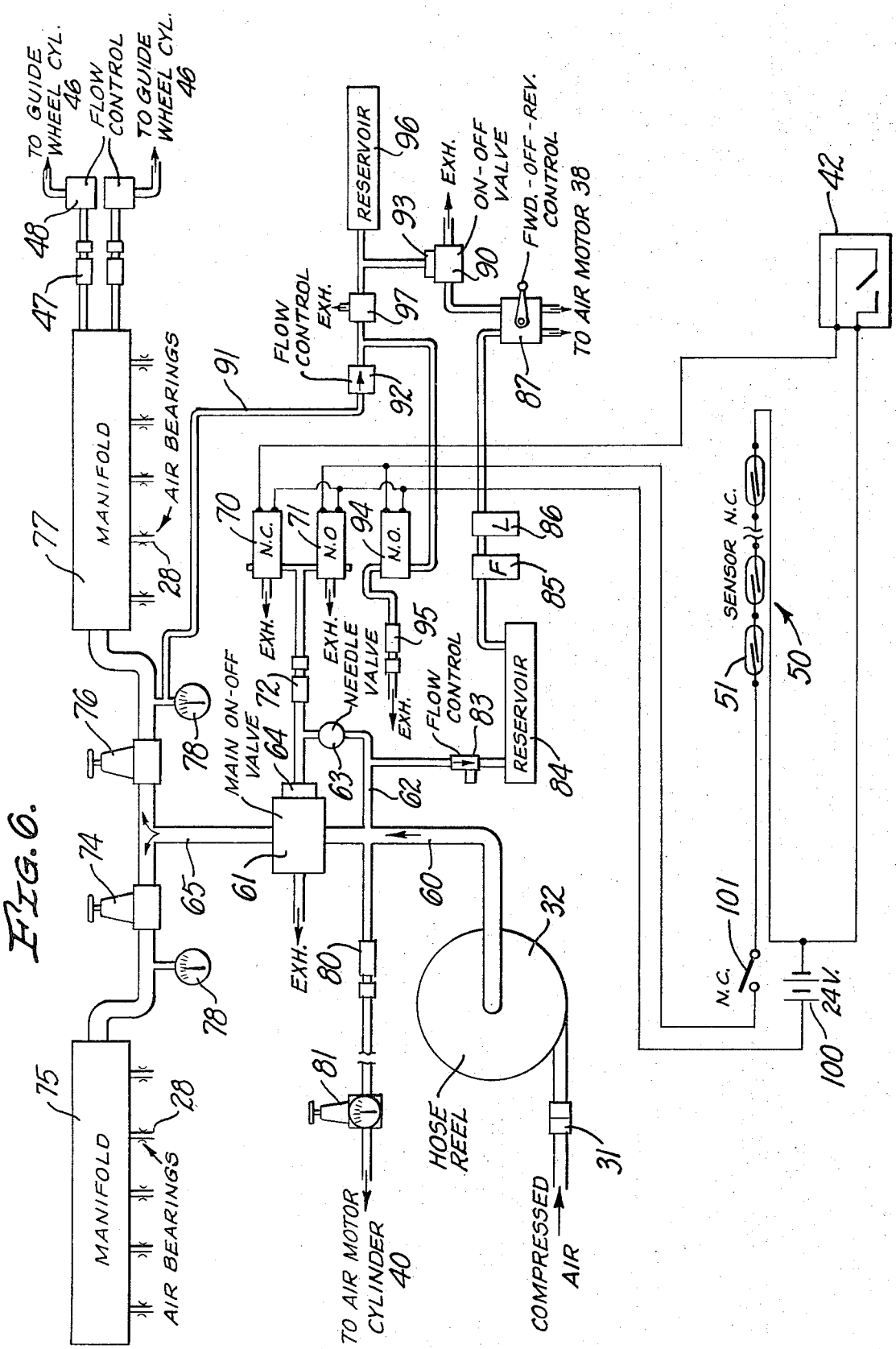

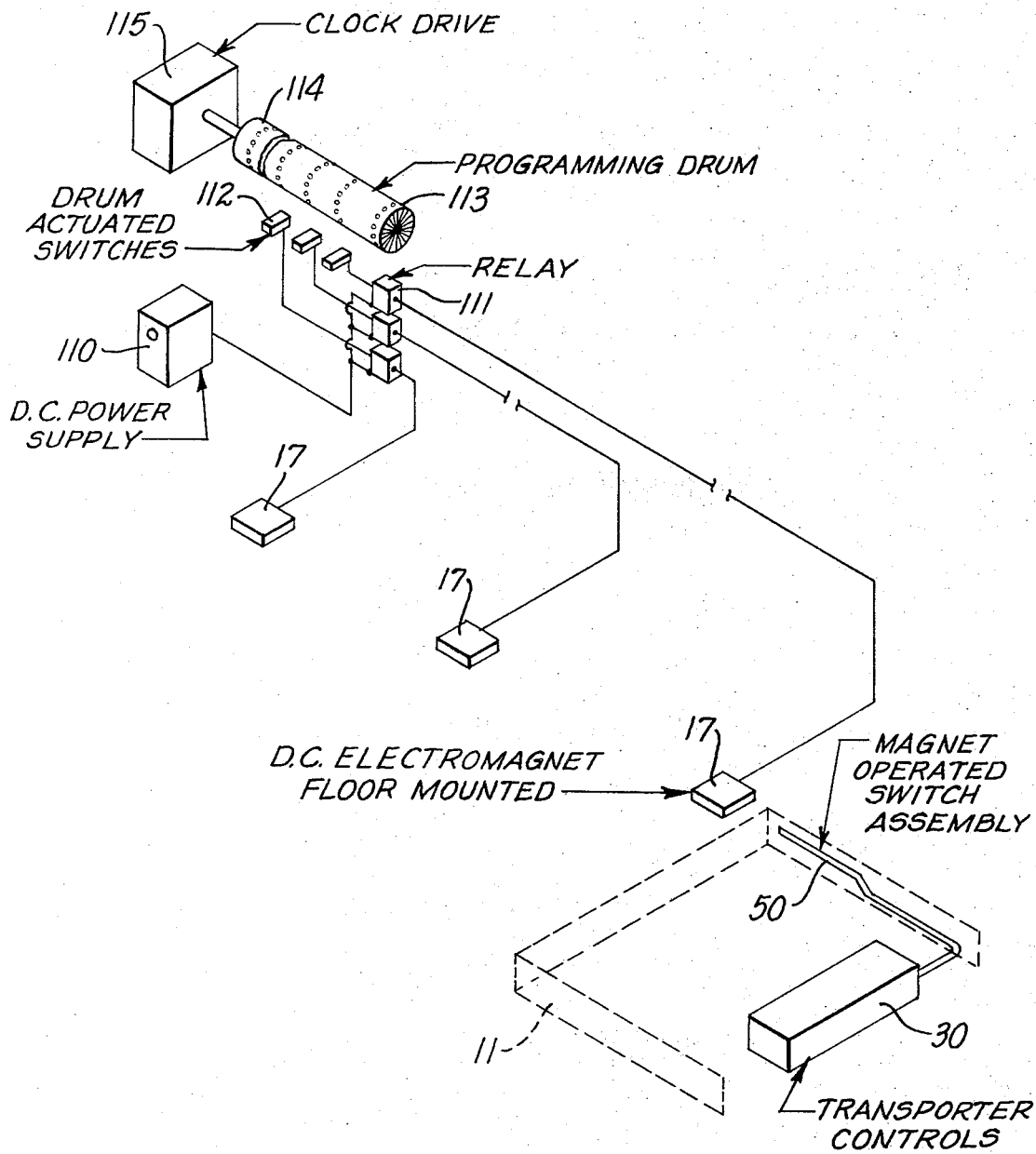

3,831,525

AUTOMATED ASSEMBLY LINE WITH AIR CUSHION DEVICES

This invention relates to assembly lines and in particular, to an assembly line with a plurality of self propelled load carriers or transporters of the air cushion type, and a control system for automatic control of movement of the transporters.

A typical air cushion transporter comprises a platform or pallet or other load supporting member and a plurality of air bearings carried under the platform. Compressed air is delivered to the air bearings which generate a film of air between the tranporter and the ground surface or path, resulting in a very low friction between the transporter and the path. A transporter of this type is shown in a copending application of Robert E. Burdick entitled Replaceable Air Cushion Device, Ser. No. 180,666, filed Sept. 15, 1971, now U.S. Pat. No. 3,756,342.

The system of the present invention is particularly suited for carrying large loads on each transporter, typically in the order of 30 tons and higher. Conventional assembly lines with this capacity would be large, complicated. expensive and subject to high maintenance costs, particularly if independent movement and control is obtained for each transporter. The present invention contemplates a plurality of independent self-propelled air cushion transporters, each capable of carrying a large load and each capable of forward movement, lateral movement and positioning independent of the other transporters along the line. One specific embodiment illustrated herein calls for an assembly line 250 feet long with 34 separate transporter control points and eight trransporters disposed along the line, with the transporter movements for an 8 hour shift programmed in advance, with transporter movements controlled at 2 minute intervals throughout the shift.

Accordingly, it is an object of the present invention to provide such a new and improved automated assembly line, with transporters and controls for use therewith. Other objects, advantages, features and results will more fully appear in the course of the following description. The drawings merely show and the description merely describes a preferred embodiment of the present invention which is given by way of illustration or example.

In the drawings:

FIG. 1 is a plan view of an assembly line incorporating the presently preferred embodiment of the invention:

FIG. 2 is an enlarged sectional view taken along the line 2—2 of FIG. 1;

FIG. 3 is a top view of the transporter of FIG. 2;

FIG. 4 is a side view of the transporter of FIG. 3;

FIG. 5 is a sectional view taken along the line 5—5 of FIG. 1;

FIG. 6 is an pneumatic and electrical schematic of the controls for a transporter; and FIG. 7 is an electrical schematic in block diagram forming illustrating the programming control.

In FIG. 1, a plurality of transporters 10, 11, 12, 13 are disposed along a path in the assembly area, with the path defined by a concrete pad 14. Transporter guide channels 15, 16 extend along the path with a plurality of signal generators 17 positioned along the path. In the embodiment illustrated in FIG. 1, the transporters 10–12 carry tracked vehicles during assembly, with the tracks resting on the transporters and moving from right to left. A completed vehicle on the transporter 12 may be driven onto fixed pads 20 for further transport by the transporter 13, which engages the vehicle frame between the tracks thereof. The concrete pad 14 is utilized to provide a smooth floor or surface for the air cushion vehicles and includes a portion 21 for lateral movement of a transporter after a vehicle is driven onto the pads 20, and a portion 22 for storage of transporters at the beginning of the assembly line. While a particular floor surface in the form of the concrete pad 14 is illustrated, it is recognized that there is no particular limitation on the floor and various conventional surfaces can be utilized.

The transporter 11 is shown in greater detail in FIGS. 2, 3, and 4 and may comprise two load carrying structures or pads 25 joined by beams 26, with each structure comprising four box beams welded together and to an external frame or shield 27 and to the cross beams 26. Five air bearings 28 are provided for each of the pads 25, with the air bearings preferably being of the removable type as disclosed in the aforsaid copending application.

A control box 30 is mounted between the pads 25 and serves as a housing for various electrical and pneumatic controls. Compressed air may be supplied to the transporter from a source positioned along the assembly line by means of a flexible hose which is connected to the transporter at coupling 31. A hose reel 32 is mounted in the housing between a pair of the beams 26 and functions in the customary manner to take up the slack in the air line connected at 31, a piece of the hose being seen at 33. Open ended box beams 34 are positioned between a pair of the beams 26 to provide engaging zones for movement of a transporter with a fork lift. A drive unit 37 is mounted between the beams 34 and provides the motive power for moving the transporter along the assembly line. The drive unit may be conventional in design and incorporates an air operated motor 38 driving a pair of wheels 39, and an air operated cylinder 40 which moves the wheels downward into engagement with the ground surface.

A large object sensing unit 42 is mounted on one of the beams 26 facing in the forward direction of motion of the transporter. This unit may be conventional in design and provides a control function when a large object is within a predetermined distance of the front end of the transporter. The unit 42 serves to shutoff power to the transporter when another transporter is dangerously close, but does not affect transporter operation when a workman moves in front of the transporter.

A floating skirt 43 may be carried on each of the pads 25 for engaging the ground surface to sweep objects out of the paths of the air bearings. The skirt is made moveable in a vertical direction so that it will engage the ground for all degrees of inflation of the air bearings. Guide wheels 44 are provided at the forward and rearward edges of the transporter for engaging the guide channel 15 and prevent lateral movement of the transporter. Each guide wheel is carried on a pivoted arm 45 which is urged downward into engagement with the guide channel by an air cylinder 46. Air is provided to each of the cylinders 46 through a slide valve 47 and a flow control valve 48 (see FIG. 6). The slide valves 47 may be manually closed to shutoff air to the cylinders 46 when lateral movement of a transporter is desired.

A signal sensor 50 is carried on the transporter for positioning over each of the signal generators 17 as the transporter moves along the assembly line. Each signal generator 17 typically is an electromagnet energized from a power supply as will be described in conjunction with FIG. 7. The signal sensor 50 may comprise a plurality of reed switches 51 connected in series and disposed in a line, with the switches normally closed. Thus when the sensor 50 passes over one of the signal generators which is generized and therefore producing an electromagnetic field, one or more of the reed switches 51 will be moved to the open circuit condition, thereby providing an open circuit signal from the sensor.

The transporter 13 is similar in design and construction to the transporters 10–12, and operates in the same manner and will not be described in detail. The transporter 13 has a central load carrying member 54 designed for engaging the frame of the vehicle, permitting the tracks to extend on either side of the transporter so that the vehicle drive train can be operated out of engagement with the floor.

The pneumatic and electrical equipment for each transporter is illustrated in FIG. 6. The compressed air supply is provided at the connector 31 to the air hose on reel 32 and thence through a conduit 60 to a main on-off valve 61. Air is supplied through branch line 62 and a needle valve 63 to the control inlet 64 of the valve 61, with the valve 61 actuated to connect the air supply to line 65 when there is pressure at the control inlet 64. When the control inlet 64 is connected to exhaust through solenoid operated valve 70 or 71, the air supply is shutoff from the line 65. A manually operated slide valve 72 is connected between the valve 61 and the valves 70, 71 to block the exhausting action of the solenoid valves 70, 71 when it is desired to move the transporter laterally.

Air is directed from the line 65 through a pressure regulator 74 to a manifold 75 for supplying air to the air bearings 28 of one of the load carrying pads. Air is directed through another regulator 76 to another manifold 77 for supplying air to the air bearings of the load carrying pad. Pressure gauges 78 provide an indication of the air pressure to the air bearings, which may be adjusted by the regulators 74, 76. Air for the guide wheel cylinders 46 is provided from the manifold 77 through the previously mentioned slide valves 47 and flow control valves 48.

Air for the down and up cylinder 40 of the drive unit 37 is provided from the line 60 through another manually operated slide valve 80 and a pressure regulator 81 with builtin pressure gauge. Air is provided to the air motor 38 of the drive unit 37 through a flow control valve 83, a reservoir 84, a filter 85, and a lubricator 86. A three-position manually operated control unit 87 provides direction control for the air motor of the drive unit. Normal control of the air motor 38 is achieved by an on-off valve 90 connected in the exhaust line of the motor. Air pressure for maintaining the valve 90 in the on condition is provided through line 91 and flow control valve 92, with the valve 90 being moved to the motor off position by connecting the valve control valve 94. A manually operated slide valve 95 in the exhause line of the valve 94 can be used to block the control action of the solenoid valve 94. Valve 99 is a quick exhaust valve which allows downstream air to exhaust to atmosphere rapidly when and only when the upstream air pressure drops below downstream air pressure.

At start up, the time required to build up sufficient pressure in the reservoir 96 to actuate the pilot pressure operated valve 90 is made long enough to allow time for manifold 77 to fill and start the air bearings operating before the change of air in reservoir 84 is allowed to pass to the air motor 38. If this change is delivered to the air motor too soon, it will be expended before the load is frictionless, in that the drive wheel powered by the air motor will spin in place.

The presence of the guide exhaust valve 97 and its companion flow control valve 92 are to allow the reservoir 96 to dump to atmosphere quickly when the whole system is commanded to shut down, thereby shutting off valve 90 blocking air motor exhaust air, thereby allowing it to act as a brake, bringing the transporter to stop prior to the complete exhausting of air from the air bearings which takes so long to get out that the transporter would otherwise "coast" on past its desired stopping point.

The solenoid of the valve 70 is connected in series with the switch of the unit 42 across a battery supply 100. The solenoid of each of the valves 71, 94 are connected in series with a normally closed switch 101 and the normally closed switches 51 of the sensor 50 across the power supply 100. Switch 101 is a micro-switch attached to the lid of the control box 30 such that when the lid is open the circuit is broken, so that the transporter may be operated manually away from the electromagnets 17. When switch 101 is closed the only thing keeping the transporter from moving along the pad 14 is the presence of an energized electromagnet which holds the reed switches 51 open.

Under normal operating conditions, all the air bearings of a transporter are inflated and the transporter is floating on a film of air, the guide wheel cylinders are energized and the guide wheels are in engagement with the guide channel, the switch of the object sensor unit is open, the switch 101 and the switches 51 of the sensor 50 are closed, the valves 70, 71 and 94 are closed, the air motor cylinder 40 is energized placing the wheels in engagement with the floor, and the air motor 38 is energized to rotate the wheels and move the transporter slowly along the assembly line. That is, under normal operating conditions, each transporter is moving along the assembly line at a predetermined rate and independent of all other transporters. If for some reason, a transporter approaches too closely to a preceding transporter, the unti 42 is actuated to close the switch thereof and energize the solenoid valve 70, exhausting the control inlet 64 of the main on-off valve 61 and shutting off air to the air bearings guide wheel cylinders and air motor. The air supply is maintained to the air motor cylinder 40 keeping the drive wheels in engagement with the ground to limit movement of the transporter. When the proximity problem has been resolved, the switch in the unit 42 will open and the air supply will be restored with the transporter resuming normal forward movement.

Position control along the assembly line is achieved by energizing a selected signal generator 17 so that when the sensor 50 of the transporter passes over the particular signal generator, one or more of the switches 51 will be opened, denergizing the solenoid valves 70, 94 and thereby shutting off air to the air bearings and drive motor so the the transporter stops at the location of the energized signal generator. The transporter remains in this position until the signal generator is denergized, permitting closure of the switches 51 and reconnection of power to the air bearings and drive motor. With this arrangement, the movement of each transporter can be controlled individually and independently of other transporters, by selectively energizing the signal generators 17.

A transporter can be moved laterally, as onto the portion 21 of the track, by closing the various slide valves thereby raising the guide wheels out of the guide channel and raising the drive wheels from the ground, while maintaining air supply to the air bearings. The transporter can now be manually moved in any direction but guidance and control have to be supplied externally of the transporter.

A preferred embodiment of a control system for selectively and sequentially energizing the signal generators 17 is illustrated in FIG. 7.

Each of the signal generators 17 is energized from a power supply 110 through a relay 111, a separate relay being provided for each signal generator. Each relay is in turn controlled by a switch 112, with each switch controlled by a track 113 on a programming drum 114. The drum 114 is driven in rotation at a constant speed by a clock type drive 115 and in the particular embodiment illustrated, each track 113, provides a programming pin location for actuating the corresponding switch 112 every 2 minutes, other time intervals can be selected as desired. Conventional programming drums and drum actuated switches can be utilized if desired.

In operation, a switch actuating pin is inserted in the appropriate track of the drum at each time interval it is desired to energize a signal generator and stop a transporter at the location of the energized signal generator. When this particular pin engages the switch 112, the corresponding relay 111 is actuated to connect the power supply 110 to the electromagnet of the signal generator 17. When a pin is omitted for a particular position on the track, there will be no signal produced at the signal generator for that time. The duration of a program run is limited only by the number of positions in a track or alternatively, by the number of drums which are utilized in sequence. A plurality of drums can be utilized in sequence, with the last position of a track being used to switch controls to the next succeeding drum. With this arrangement, a preprogrammed automatic control can be set for a shift or for a day or for a week as desired. If a line is to be shut down during a rest break or a lunch break or overnight, this is accomplished by simply shutting off the drive unit 115 and of course shutting off the air supply to the transporters.

When desired, one or more of the relays 111 can be of the time delay type to provide a first control function during a portion of the time interval between pins on a program track and to provide a second control function for the remainder of the time interval. By way of example, actuation of a switch 112 to a first position can energize the relay 111 to not connect the power supply to a signal generator and thereby permit a transporter to move away from the location of such signal generator, with the relay then switching to the opposite condition after a period of time to then connect the power supply to the signal generator and stop the next transporter at the signal generator location, with this relay operation being automatically controlled by a time delay built into the relay. Relays and time delays of this nature are conventional and various commercially available items can be utilized to provide this function.

We claim:
1. In an assembly line, the combination of:
a plurality of signal generators positioned along a path through an area;
signal control means for selectively actuating said signal generators to generate stop signals; and
a plurality of air cushion transporters, each of said transporters including
means for supporting a load thereon,
a plurality of air bearings,
drive means for propelling the transporter along said path,
conduit means for supplying air under pressure to each of said air bearings,
a sensor for sensing a stop signal from a signal generator,
air control means for connecting an air supply to said conduit means,
means for connecting said sensor to said air control means and to said drive means in controlling relation for inflating said air bearings and energizing said drive means to move the transporter along the path until a stop signal is sensed,
first means carried on each of said transporters for detecting the presence of another transporter ahead of the one transporter, and
second means operable in response to detection of another transporter by said first means to shutoff the air supply to said bearings of said one transporter.

2. In an assembly line, the combination of:
a plurality of signal generators positioned along a path through an area;
signal control means for selectively actuating said signal generators to generate stop signals; and
a plurality of air cushion transporters, each of said transporters including
means for supporting a load thereon,
a plurality of air bearings,
drive means for propelling the transporter along said path,
conduit means for supplying air under pressure to each of said air bearings,
a sensor for sensing a stop signal from a signal generator,
air control means for connecting an air supply to said conduit means, and
means for connecting said sensor to said air control means and to said drive means in controlling relation for inflating said air bearings and energizing said drive means to move the transporter along the path until a stop signal is sensed;
said signal control means including
a set of switches with a switch for each of said signal generators,
means for selectively actuating each of said switches at predetermined time intervals, and
delay means for a selected switch and signal generator and operable when the switch is actuated to not generate a stop signal at the start of a time interval, to generate a stop signal after a portion of said time interval has passed.

3. In an assembly line, the combination of:
a plurality of signal generators positioned along a path through an area;
signal control means for selectively actuating said signal generators to generate stop signals; and
a plurality of air cushion transporters, each of said transporters including
means for supporting a load thereon,
a plurality of air bearings,
drive means for propelling the transporter along said path,
conduit means for supplying air under pressure to each of said air bearings,
a sensor for sensing a stop signal from a signal generator,
air control means for connecting an air supply to said conduit means, and
means for connecting said sensor to said air control means and to said drive means in controlling relation for inflating said air bearings and energizing said drive means to move the transporter along the path until a stop signal is sensed,
said drive means including an air operated motor driving a wheel and an air operated cylinder for engaging said wheel with the path, with an air supply to said cylinder independent of said sensor and air control means.

4. In an assembly line, the combination of:
a plurality of signal generators positioned along a path through an area;
signal control means for selectively actuating said signal generators to generate stop signals; and
a plurality of air cushion transporters, each of said transporters including
means for supporting a load thereon,
a plurality of air bearings,
drive means for propelling the transporter along said path,
conduit means for supplying air under pressure to each of said air bearings,
a sensor for sensing a stop signal from a signal generator,
air control means for connecting an air supply to said conduit means, and
means for connecting said sensor to said air control means and to said drive means in controlling relation for inflating said air bearings and energizing said drive means to move the transporter along the path until a stop signal is sensed;
a guide track along said path; and
for each transporter at least one guide wheel, and
means for mounting said guide wheel on the transporter with said guide wheel engageable with said track for guiding the transporter as it moves longitudinally along the path and including an air actuated cylinder and piston urging said wheel to said track and means for moving said wheel from said track when the air supply is shut off, permitting lateral movement of the transporter.

5. In an assembly line, the combination of:
a plurality of signal generators positioned along a path through an area;
signal control means for selectively actuating said signal generators to generate stop signals; and
a plurality of air cushion transporters, each of said transporters including
means for supporting a load thereon,
a plurality of air bearings,
drive means for propelling the transporter along said path,
conduit means for supplying air under pressure to each of said air bearings,
a sensor for sensing a stop signal from a signal generator,
air control means for connecting an air supply to said conduit means,
means for connecting said sensor to said air control means and to said drive means in controlling relation for inflating said air bearings and energizing said drive means to move the transporter along the path until a stop signal is sensed,
an air operated drive motor,
an air line for supplying air under pressure to said drive motor,
a first control for the air in said air line,
a first air reservoir for said first control with said control providing air to said drive motor when pressure in said first reservoir is at least a predetermined value,
with said air bearing conduit means including a second reservoir, and
a second control connected between said air bearing conduit means and said first reservoir for exhausting said first reservoir when the pressure in said second reservoir is less than the pressure in said first reservoir.

* * * * *